June 5, 1934.     T. F. LUNDY     1,961,298
LIQUEFIER SCREW COVER
Filed Aug. 14, 1933
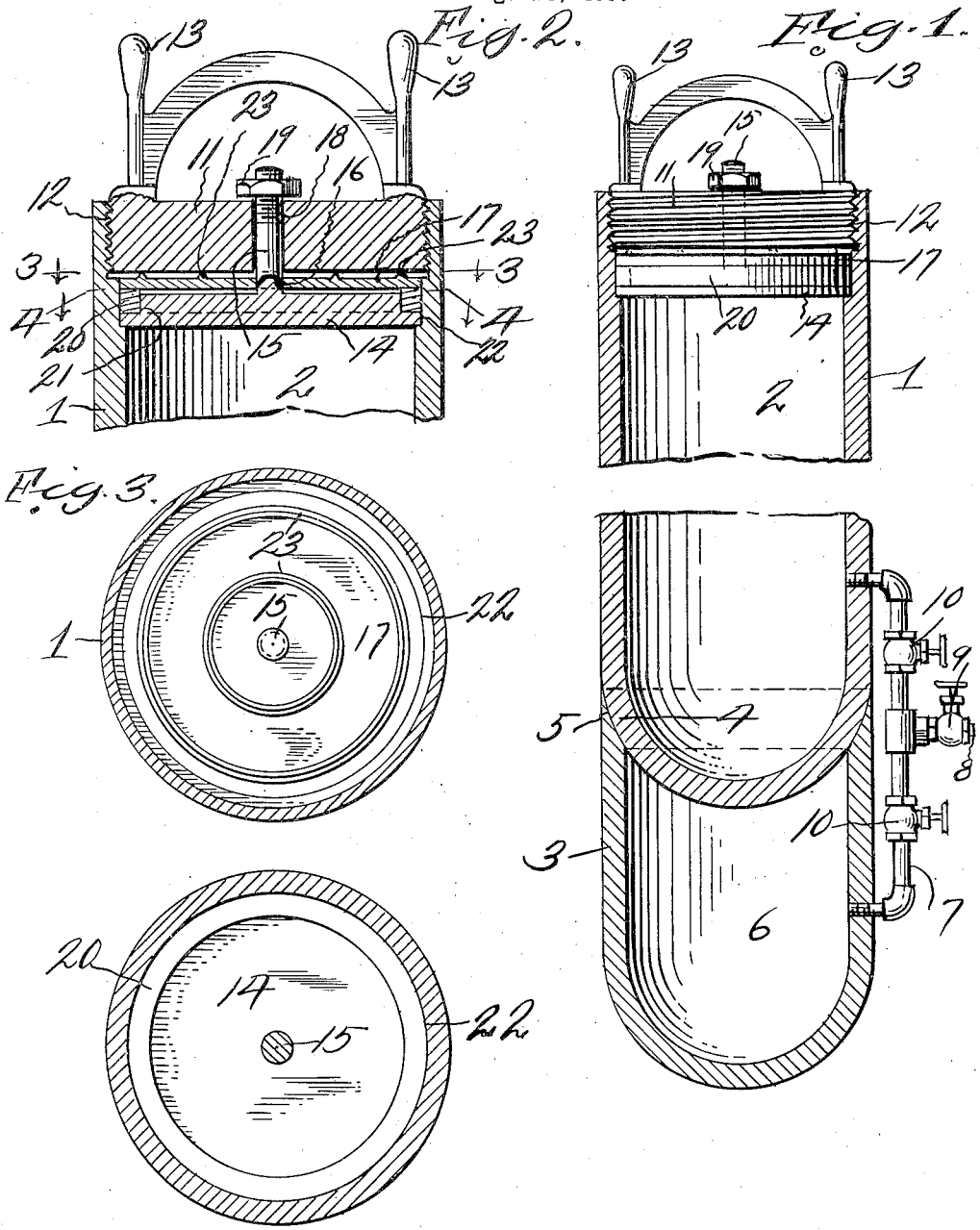
Inventor
Thomas F. Lundy
By Philip A. H. Serrell
Attorney Patented June 5, 1934

1,961,298

UNITED STATES PATENT OFFICE 1,961,298

LIQUEFIER SCREW COVER

Thomas F. Lundy, Tulsa, Okla., assignor to CO2 Appliance Company, Tulsa, Okla.

Application August 14, 1933, Serial No. 685,128

8 Claims. (Cl. 62—91.5)

The invention relates to liquefiers for carbon dioxide of the type used in connection with soda water fountains and the like, for carbonating purposes, and has for its object to provide a liquefier and closure therefor wherein the closure can not be removed until pressure within the liquefier is relieved, and the closure is formed from a plurality of plates having an expansible gasket means therebetween adapted to be expanded by the forcing of the plates together incident to pressure within the liquefier generating chamber exerted on one of said plates.

A further object is to form the head from a threaded member adapted to be threaded into the upper end of the liquefier and having connected thereto a rib contact plate and a compression plate against which the pressure acts after the threaded member is in place and an annular gasket between the contact plates and the compression plates and adapted to be expanded incident to pressure on the compression plate.

A further object is to form the closure from a threaded member disposed in a threaded portion of the liquefier and spaced plates disposed in the counterbore of the liquefier and having interposed between the same an expansion gasket. Also to provide the inner compression plate with a bolt extending through the contact plate and through the threaded member and having threaded thereon a nut for forcing the plate and threaded member together.

A further object is to provide the contact plate with ribs adapted to engage the inner face of the threaded member, thereby preventing cohesion of the contact plate to the threaded member upon high pressure.

With the above and other objects in view the invention resides in the combination and arrangement of parts as hereinafter set forth, shown in the drawing, described and claimed, it being understood that changes in the precise embodiment of the invention may be made without departing from the spirit of the invention.

In the drawing:

Figure 1 is a vertical transverse sectional view through the liquefier.

Figure 2 is a vertical transverse sectional view through the upper end of the liquefier and the closure.

Figure 3 is a horizontal sectional view taken on line 3—3 of Figure 2.

Figure 4 is a horizontal sectional view taken on line 4—4 of Figure 2.

Referring to the drawing, the numeral 1 designates the upper section of the liquefier and 2 a chamber therein. The lower section 3 of the liquefier is substantially the same diameter as the upper section 1 and receives the lower convexed end 4 of the upper section 1, which is provided with a concaved annular seat 5 conforming to the curvature of the lower end 4 of the upper section, thereby forming a relative large bearing surface for the upper section. The sections are welded together at their engaging surfaces 4 and 5 to form a single cylinder having an upper generating chamber, in which carbon dioxide is placed and sublimed, and a storage chamber 6, into which generated gas is transferred through by-pass pipe 7 for storage purposes. By-pass pipe 7 is provided with a discharge pipe 8 having a valve 9 therein and control valves 10 adapted to be manipulated for discharging from either the generating chamber 2 or the storage chamber 6 is desired, and particularly from the chamber 2 to allow removal of the cover for refilling purposes.

In covers heretofore constructed for liquefiers, in which excessive pressures are generated, for instance twelve hundred pounds to the square inch where a carbon dioxide is used, considerable danger is incurred in removing the cover before the gas in the generating chamber is relieved, as a rapid release of gas and expansion thereof will often shatter the parts and injure the operator. To obviate this difficulty, as well as other mechanical ones the present cover is designed. The cover comprises a threaded member 11 which is threaded at 12 into the upper end of the casing section 1, and is provided with handle members 13, adapted to be grasped by the operator.

Disposed within the chamber 2 is a compression plate 14, which compression plate is provided with an upwardly extending threaded stud 15, extending through an aperture 16 in a contact plate 17, and an aperture 18 in the threaded member 11. Stud 13 is provided with a nut 19, which is adapted to be tightened for forcing the compression plate 14 towards the contact plate 17 for compressing the yieldable gasket 20, disposed in an annular channel 21 in the outer periphery of the compression plate 14. Compression plate 14, contact plate 17 and gasket 20 are disposed in a counterbore 22 of the threaded end of the casing 1, as clearly shown in Figure 2, and when the gasket is expanded it is forced into peripheral binding engagement with the periphery of the counterbore 22, thereby preventing leakage. It will be noted that there is freedom of movement or spacing between plates 14 and 17, therefore the gasket will be compressed transversely for the expanding operation.

It has been found to prevent adhesion of the contact plate 17 to the inner face of the threaded member 11, that annular ribs 23 on the upper face of the contact plate 17 in engagement with the threaded member 11 will accomplish the desired result. Where two flat surfaces are engaged, the cohesion, under excessive pressure, will often prevent rotation of the threaded member 11, particularly with the expansive cohesion of the gasket 20 in the counterbore 22.

In operation with the cover removed, the operator places the carbon dioxide in the chamber 2 and then places the cover in position, screwing the member 11 downwardly as far as possible. This action will place the parts in position and the operator tightens the nut 19 and intermittently rotates the member 11 for the gasket compression operation.

It will be noted if there is leakage, the operator can easily ascertain the same, as it is obvious that the pressure on the compression plate 14 will slightly raise the nut 19, and when this is indicated, it will only be necessary for the operator to tighten the nut, for further compressing the gasket 20 for peripheral expansion.

When it is desired to open the device by removing the cover, it is obvious that the operator can not rotate the cover against the expansive action of the gas on the compression plate and the binding engagement of the gasket 20 in the channel 22, therefore danger to the operator is obviated, however by opening valves 9 and 10, the operator can utilize the gas in the generating chamber 2 until the pressure is low enough not to be dangerous, and at the same time allow the removal of the cover, which is accomplished by loosening the nut 19 to the position shown in Figure 2 and rotating the member 11, which will rotate on the annular V-shaped ribs 23.

From the above it will be seen that a liquefier cover is provided which is simple in construction, the parts reduced to a minimum, and one which may be cheaply manufactured and sold. Although conventional thread are shown at 12, it is to be understood that any kind of thread may be used, for instance buttress thread, a quick thread or an interrupted thread if desired.

The invention having been set forth what is claimed as new and useful is:

1. A single cylinder liquefier formed from two sections of substantially the same diameter and comprising upper and lower sections, the lower end of the upper section being closed and convexed and disposed in a circumferential annular concaved groove in the upper end of the lower section said concaved groove conforming to the curvature of the lower end of the upper section.

2. A liquefier comprising an upper section having a closed lower end, a lower section having an open upper end, and in which the upper end of the lower section receives a convexed end of the upper section in annular channel conforming to the curvature of the curved lower end of the upper section.

3. The combination with the open end of a gas liquefier, of a closure for said end, said closure comprising a threaded member threaded into the liquefier opening, a compression plate carried by said threaded member in spaced relation thereto, a contact plate interposed between the threaded member and the compression plate in spaced relation thereto, an expansible gasket interposed between said contact and expansion plate and a bolt carried by the compression plate and extending through the contact plate and the threaded member and contact ribs carried by the contact plate and engaging the threaded member.

4. The combination with the open end of a gas liquefier, of a closure for said end, said closure comprising a threaded member threaded into the liquefier opening, a compression plate carried by said threaded member in spaced relation thereto, a contact plate interposed between the threaded member and the compression plate in spaced relation thereto, an expansion gasket interposed between said contact and expansion plate, a bolt carried by the compression plate and extending through the contact plate and threaded member and concentric contact ribs forming means for maintaining the threaded member and contact plate in spaced relation.

5. The combination with a gas liquefier closure disposed within the open end of the liquefier, said closure comprising a compression plate, a threaded member threaded into the liquefier in spaced relation to the compression plate, a contact plate in spaced relation to the compression plate, a gasket between the compression plate and the contact plate, a bolt carried by the compression plate and extending through the contact plate and threaded member, said compression plate being disposed within the counterbore in the liquefier, said counter-bore forming means for limiting the downward movement of the compression plate when disconnected from the threaded member.

6. A device as set forth in claim 5 including spacing means between the contact plate and the threaded member.

7. A gas liquefier head comprising a threaded member threaded into a liquefier opening, a compression plate in spaced relation to the threaded member, a contact plate between the compression plate and the threaded member in spaced relation thereto, a gasket interposed between the contact plate and the compression plate and spacing means between the contact plate and the threaded member and forming means whereby the contact plate and threaded member are prevented from cohesion.

8. A liquefier cover disposed within a liquefier opening, said cover comprising a compression plate, a threaded member threaded into the liquefier opening, packing means between the compression plate and the threaded member, a bolt carried by the compression plate and extending upwardly through the threaded member and packing means, a nut carried by said bolt above the threaded member, said compression plate being disposed within a counterbore within the liquefier opening, said counterbore forming a shoulder on which the compression plate may rest when the bolt nut is removed thereby preventing the compression plate from dropping downwardly into the liquefier when the nut is removed.

THOMAS F. LUNDY.